United States Patent [19]
Baker

[11] Patent Number: 5,113,475
[45] Date of Patent: May 12, 1992

[54] FIBRE-OPTIC ENTRY TO AN ENCLOSURE

[75] Inventor: Peter D. Baker, Basingstoke, England

[73] Assignee: Smiths Industries Public Limited Co., London, England

[21] Appl. No.: 666,748

[22] Filed: Mar. 8, 1991

[30] Foreign Application Priority Data

Mar. 14, 1990 [GB] United Kingdom ............... 9005744

[51] Int. Cl.$^5$ ............................................. G02B 6/36
[52] U.S. Cl. ..................................... 385/138; 385/76
[58] Field of Search ............... 350/96.20, 96.21, 96.22; 385/82, 83, 84, 76, 77, 78, 138

[56] References Cited

U.S. PATENT DOCUMENTS

| 4,460,243 | 7/1984 | Strait, Jr. ............... 350/96.20 X |
| 4,900,117 | 2/1990 | Chen ......................... 350/96.20 |
| 4,962,991 | 10/1990 | Carvalho .................. 350/96.21 |

FOREIGN PATENT DOCUMENTS

| 0023114 | 1/1981 | European Pat. Off. . |
| 0340950 | 11/1989 | European Pat. Off. . |
| 2089065 | 6/1982 | United Kingdom . |
| 2140930 | 12/1984 | United Kingdom . |

Primary Examiner—John D. Lee
Assistant Examiner—Phan T. Heartney
Attorney, Agent, or Firm—Pollock, Vande Sande & Priddy

[57] ABSTRACT

An optical fibre connector or similar entry for an optical fibre cable to an aperture in a enclosure has a metal shell supporting a resilient insert made of an elastomeric polymer loaded with up to about 30% of a material such as carbon particles so that the insert is absorptive of microwave energy at wavelengths similar to the size of the aperture. The faces of the insert have electrically-conductive layers thereon. The optical fibres of the cable are terminated in metal ferrules supported in apertures in the insert.

8 Claims, 1 Drawing Sheet

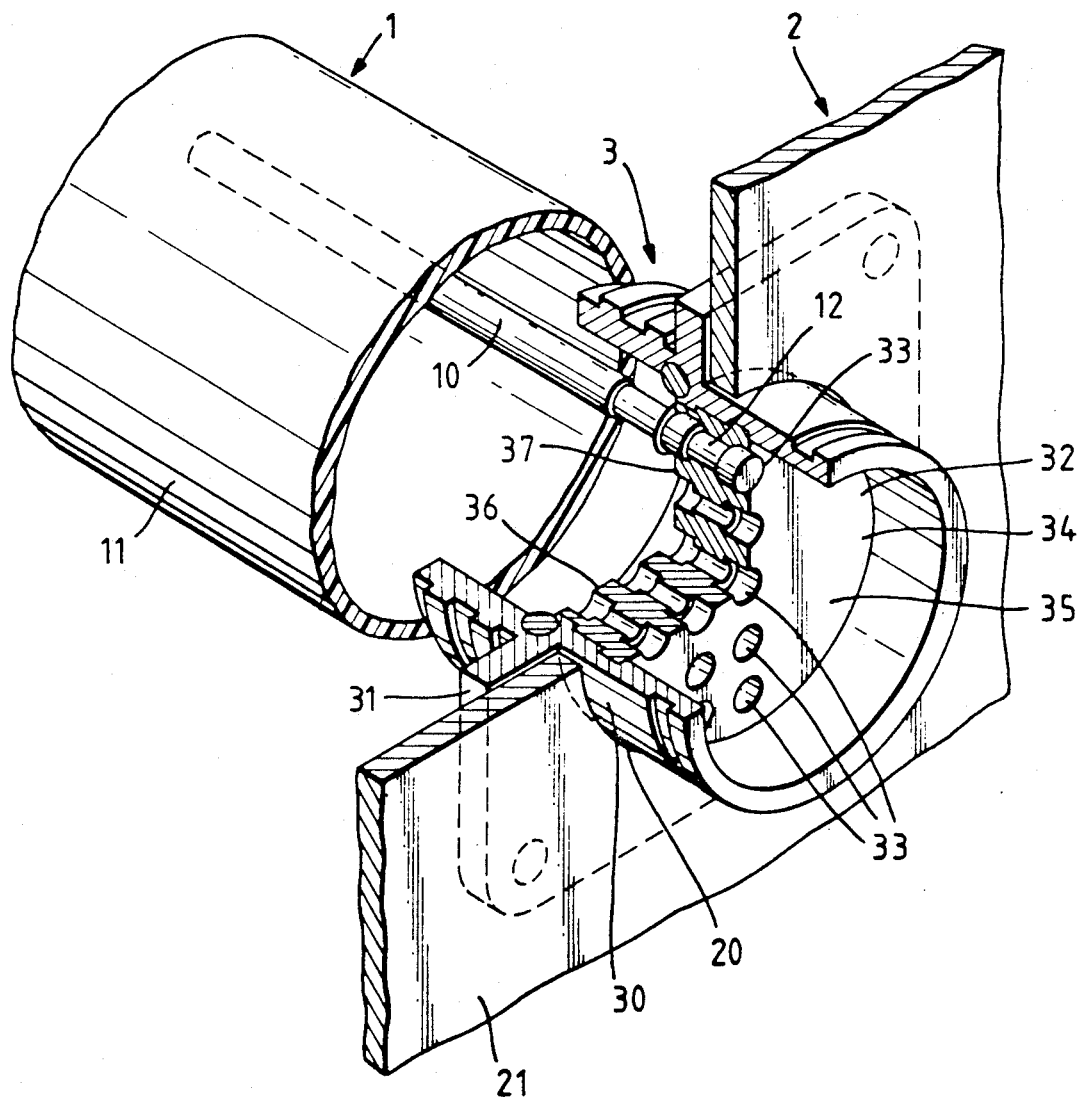

FIBRE-OPTIC ENTRY TO AN ENCLOSURE

BACKGROUND OF THE INVENTION

This invention relates to entries for optical fibres to enclosures.

The invention is more particularly concerned with reducing the transmission of electromagnetic interference where a fibre-optic cable enters an enclosure, such as, at a connector.

The use of fibre-optic cables reduces the amount of electromagnetic interference supplied to and from enclosures via the cables. The enclosures themselves may also be screened further to reduce interference. Such enclosures, however, are not entirely immune from interference because the entry point of the cable to the enclosure is an aperture of the order of wavelengths in size at microwave frequencies. Where the entry to the enclosure is in the form of a connector, each fibre of the cable will generally be terminated by a metal ferrule which each act as an antenna, coupling microwave energy through the aperture into the interior of the enclosure. This problem can be increased where the entry aperture to the enclosure is filled with a dielectric material, such as a glass or polymer, because this has the effect of increasing the size of the aperture electrically and thereby increasing the range of frequencies that can enter the enclosure.

BRIEF SUMMARY OF THE INVENTION

It is an object of the present invention to provide a fibre-optic entry to an enclosure by which interference at microwave frequencies can be reduced.

According to one aspect of the present invention, there is provided an entry for an optical fibre to an enclosure, the entry being located in an aperture in a wall of the enclosure, the or each optical fibre extending in a hole through an insert that is absorptive of microwave energy at wavelengths similar to the size of the aperture in the wall.

The insert is preferably of a first insulative material loaded with a second material. The second material is preferably selected from a group comprising: carbon particles, metal particles, carbonyl iron, metal fibres, non-conducting magnetic iron oxides and sintered ferrites. The second material may be present in proportions up to about 30% of the weight of the insert. The first material may be an elastomeric polymer and the insert is preferably resilient. The insert is preferably located within an outer metal shell. One or both faces of the insert preferably have a layer of an electrically-conductive material thereon. The optical fibre may be terminated within and supported by the insert. The optical fibre is preferably terminated in a metal ferrule supported by the insert. The entry may be an optical fibre connector, the insert having a plurality of holes into each of which extends a respective fibre.

A fibre-optic connector on an enclosure, in accordance with the present invention, will now be described, by way of example, with reference to the accompanying drawing.

BRIEF DESCRIPTION OF THE DRAWING

The drawing is a cut-away perspective view of the connector and part of the enclosure.

The drawing shows the entry point of a fibre-optic cable 1 into an electrically-screened enclosure 2 at an optical connector 3.

The cable 1 is of conventional construction comprising several optical fibres 10, only one of which is shown, which extend within a common outer sheath 11. At its forward end, the fibres 10 project from the sheath 11 and are terminated at the connector 3 within open-ended cylindrical metal ferrules or terminals 12.

The connector 3 comprises a cylindrical metal shell 30 with an integral flange 31 that projects radially outwardly about midway along the length of the shell. The flange 31 serves to secure the connector 3 within an aperture 20 in a metal wall 21 of the enclosure 2. Internally, the shell 30 of the connector supports a disc-shape insert 32 having a number of holes 33 which each extend parallel to the axis of the shell and support a respective one of the ferrules 12. The thickness of the insert 32 is substantially equal to the length of the ferrules 12.

The insert 32 is slightly resilient so that the ferrules 12 are retained in their holes 33 and the insert is retained in the shell 30 by its resilience. More particularly, the insert 32 is made of an elastomeric polymer material which is electrically insulative and is loaded with a different material so that the insert is absorptive of microwave energy at wavelengths similar to the internal diameter of the shell 30, such as at frequencies in the region of 35 GHz. The wavelengths may be down to about one eighth of the diameter of the shell. In this respect, the loading material may, for example, be carbon or metal particles, carbonyl iron, metal fibre, or non-conducting magnetic iron oxides or sintered ferrites and may be present in the insert in proportions up to about 30% by weight of the insert.

On the forward, internal face 34 of the insert 32 there is an electrically-conductive layer 35 formed by metallizing. A similar conductive layer 36 is provided on the opposite, rear or external face 37.

The insert 32, between the two layers 35 and 36, acts as a microwave absorber, so that high frequency electromagnetic energy coupling through the shell 30 will be greatly attenuated. The conductive layers 35 and 36 act further to increase the attenuation of electromagnetic energy. This functions to reduce the passage of electromagnetic interference through the aperture 20 in both directions; interference externally of the enclosure will be inhibited from entry into the enclosure, whereas electromagnetic energy produced within the enclosure will be prevented from causing interference externally of the enclosure.

Optical connection to the fibres 10 in the connector 3 is made within the enclosure 2 by means of a mating connector, not shown.

The invention is not limited to use with connectors but could be used with any entry of a fibre-optic cable into an enclosure.

What I claim is:

1. In an entry for an optical fibre to an enclosure of the kind in which the entry is located in an aperture in a wall of the enclosure, the improvement wherein the entry includes a resilient insert of a first insulative material loaded with a second material different from the first material, wherein the optical fibre extends in a hole through the insert, and wherein the insert is absorptive of microwave energy at wavelengths similar to the size of the aperture in the wall.

2. An entry according to claim 1, wherein the second material is selected from a group comprising: carbon particles, metal particles, carbonyl iron, metal fibres, non-conducting magnetic iron oxides and sintered ferrites.

3. An entry according to claim 1, wherein the second material is present in proportions up to about 30% of the weight of the insert.

4. An entry according to claim 1, wherein the first material is an elastomeric polymer.

5. An entry according to claim 1, wherein the entry includes an outer metal shell, and wherein the insert is located within the outer metal shell.

6. An entry according to claim 1, wherein the insert has a face through which the hole extends, and wherein the face has a layer of electrically-conductive material thereon.

7. An entry according to claim 1, wherein the insert includes a metal ferrule supported by the insert, and wherein optical fibre is terminated within the metal ferrule.

8. In an optical fibre connector of the kind mounted at an end of a fibre-optic cable and having an outer shell located in an aperture in a wall of an enclosure, at least one optical fibre being terminated in the connector, the improvement wherein the shell includes an insert fabricated of a material that is absorptive of microwave energy at wavelengths similar to the diameter of the shell, the optical fibre being located in a hole through the insert.

* * * * *